Dec. 22, 1959 F. E. TARTE, JR 2,918,342

TAPE REEL STORAGE DEVICE

Filed May 7, 1956 2 Sheets-Sheet 1

Inventor:
Franklin E. Tarte, Jr.
by Howson & Howson
Attys

Dec. 22, 1959 F. E. TARTE, JR 2,918,342

TAPE REEL STORAGE DEVICE

Filed May 7, 1956 2 Sheets-Sheet 2

Inventor:
Franklin E. Tarte, Jr.
by Howson & Howson
Attys.

United States Patent Office 2,918,342

Patented Dec. 22, 1959

2,918,342

TAPE REEL STORAGE DEVICE

Franklin E. Tarte, Jr., Media, Pa.

Application May 7, 1956, Serial No. 583,244

5 Claims. (Cl. 312—330)

This invention relates to a tape reel storage device and particularly a device for storage of pairs of reels bearing tape in partially recorded or partially played condition, i.e., a pair of reels onto each of which the recording tape is partially wound.

One of the advantages of the magnetic recording tape is its ability to be removed from the recorder and stored in partially recorded condition. As a consequence, and because tape is relatively inexpensive, it is quite common to employ large reels containing many hundred feet of tape. If recording is stopped before the whole reel is recorded, the tape must be rewound before it can be conveniently stored, and the next time the tape is used it must again be unwound. Moreover, it is difficult to find the point where the previous recording had terminated on a rewound tape, and much time and effort can be lost in attempting to find this point. The same problem can arise where recorded tape is played in part and the listeners wish to resume some time later from the stopping point.

The present invention is directed to a tape storage device which makes it unnecessary to rewind the recording tape which has been partially recorded or partially played, and by the same token the present invention makes it unnecessary to again unwind the tape to locate the place where recording or playing had been terminated. The present invention accomplishes this result by making it possible to store a storage reel and a take-up reel in a side-by-side relationship with the tape partially wound on each of them and extending between the two of them.

In accordance with the present invention a tape reel storage device is provided comprising a generally planar support board and a pair of splined posts supported on the board generally perpendicular to the board and spaced sufficiently far apart so that two reels of the particular size intended to be stored will not overlap when supported on the posts. Each post is adapted to engage cooperating portions of a reel so that each reel can not rotate relative to its supporting post.

In some embodiments of the present invention the posts are fixed to the support board but in other embodiments the posts are made rotatable relative to the board although they are provided with means effective to oppose the freedom of rotation, usually by a frictional expedient. This frictional opposition to rotation must be overcome in order to rotate any reel mounted on a rotatable post. Rotation is permitted in order to take up the slack in the tape between the two reels so the tape will not be loose between the two reels on the storage device and subject to tangling, twisting, or catching in any part of the storage structure. It is possible to place the tape storage board in an enclosure, and, in preferred embodiments of the invention, the boards are placed in a single enclosure in relatively parallel disposed relationship.

For a better understanding of the present invention reference is made to the following drawings in which Fig. 1 is a perspective view of a preferred form of the tape storage device;

Figures 1, 2:
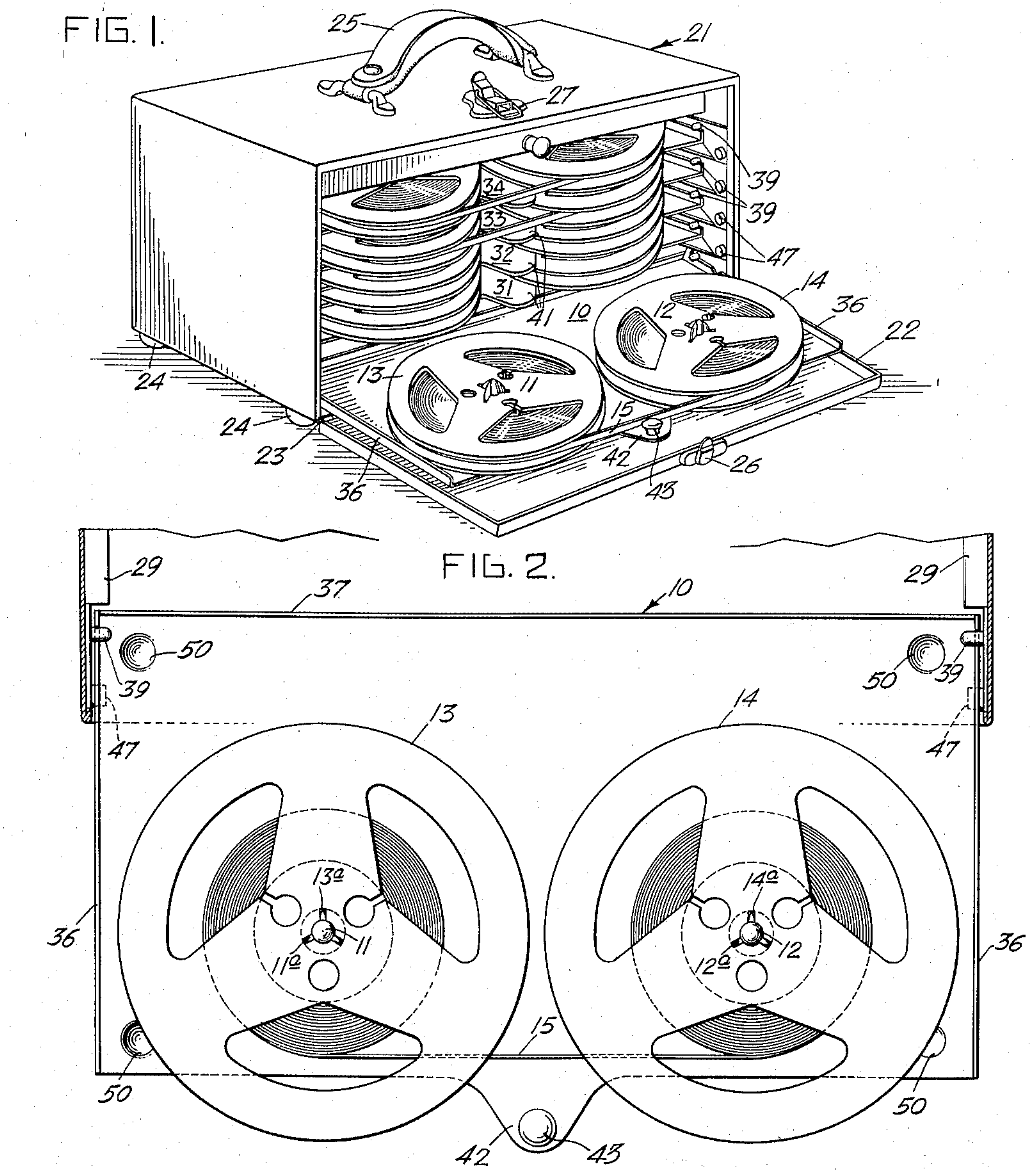
Fig. 2 is a plan view of a tape storage board of the present invention, showing in part how it can be adapted to be used with the construction of Fig. 1.

Although as shown in Fig. 1 the preferred form of the present invention includes an enclosure, in its simplest form the present invention includes simply a generally planar board 10 having a pair of splined posts fixed relative to the board and spaced sufficiently far apart that a pair of reels 13 and 14 of the size intended to be stored may be placed thereon without interfering with one another and without overlapping one another. The advantage of this tape storage device is that the tape 15 may be left on the storage reel 13 and on the take-up reel 14 in the position in which it finds itself when recording is stopped or when playing is interrupted. The posts are preferably arranged so that the tape will be stretched between the two reels as shown.

The reels are provided with recesses 13*a* radiating from the central post accepting opening in the reel and spaced apart around the opening in position to receive splines 11*a* of the posts 11. Similarly the reel 14 is provided with recesses 14*a* which receive the splines 12*a* of posts 12. The engagement of the splines and the recesses prevent the rotation of the respective reels relative to the supporting posts. Post 11 is preferably fixed to the board so that it is unable to rotate relative to the board. However, as most clearly shown in Fig. 6, post 12 is advantageously made rotatable relative to the board. This may be accomplished by providing post 12 with a base shoulder flange 16 and projecting axially below the shoulder a shank or stud 17 provided with an annular groove into which a snap ring 18 will fit. Snap ring 18 engages and holds an annular spring member 19 against the bottom of support board 10. This spring member before it is flattened as shown is advantageously somewhat concave and it is arranged with its concavity facing the bottom of the board so that in the flattened position shown it exerts considerable pressure urging the post 12 and its shoulder 16 downwardly against the top of the board, thereby supplying frictional resistance to rotation of the post 12 relative to the board.

In the course of use it will frequently occur that, when the reels are placed over the splined posts, they will leave the portion of the tape 15 that extends between them slack. However, by using the construction shown in Fig. 6, it is possible to use light finger pressure at the outer periphery of reel 14 to wind up the tape.

Figure 3:
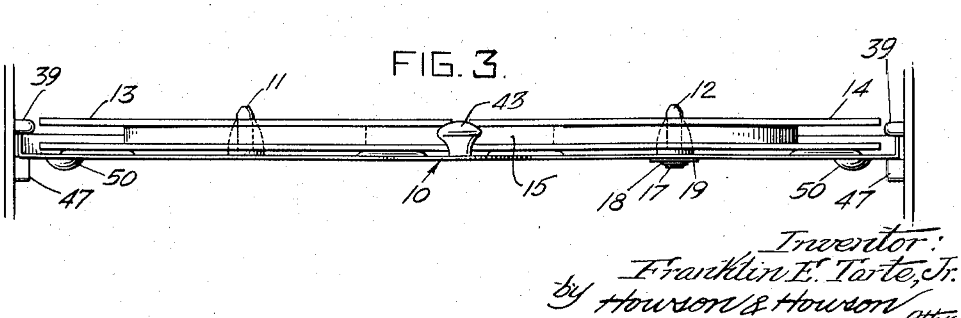
Fig. 3 is a front elevational view of the tape storage board of Fig. 2.
Figures 4, 5, 6:
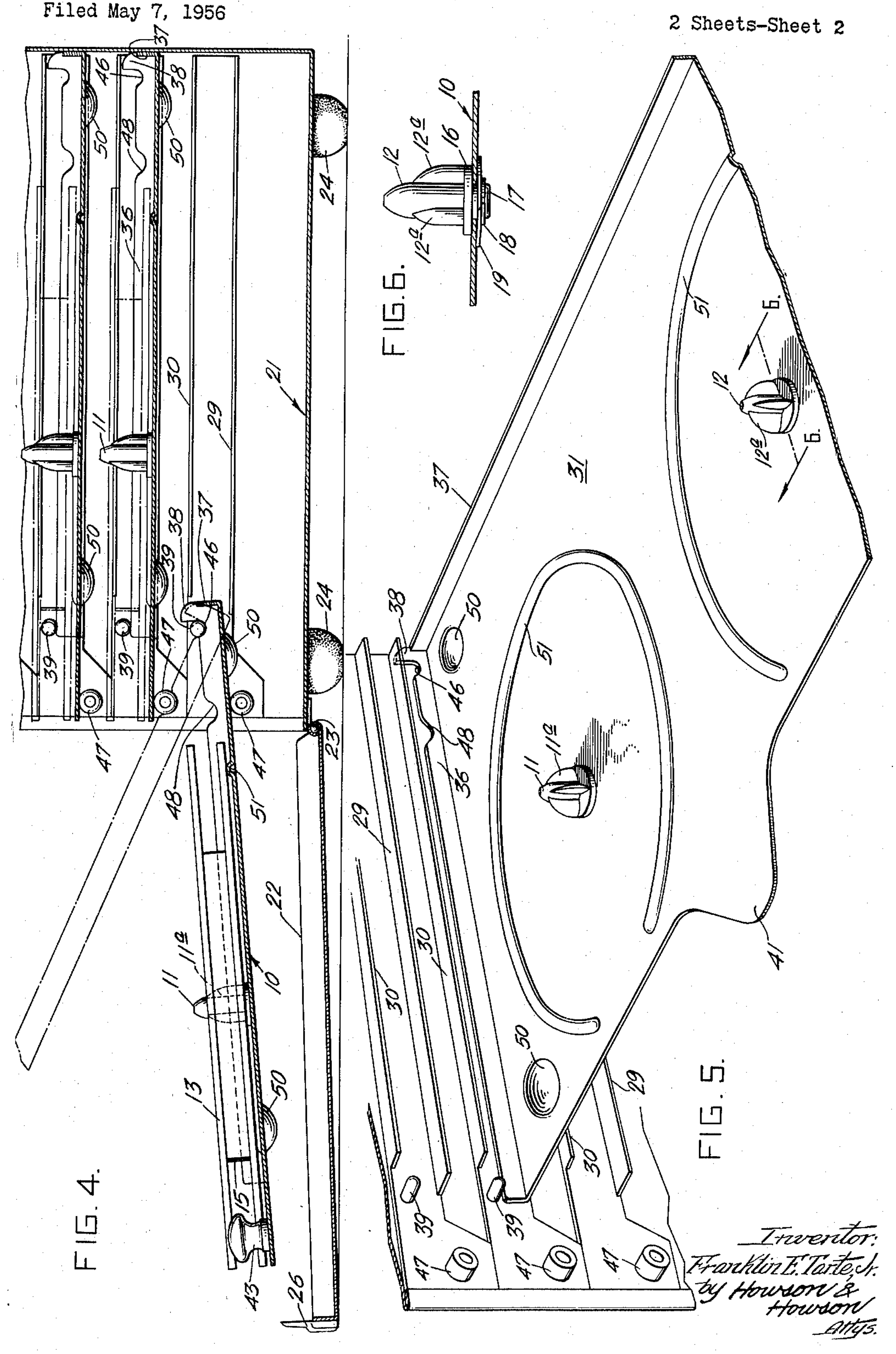
Fig. 4 is a side sectional elevational view showing the lower portion of the storage device of Fig. 1 in the position shown in Fig. 1.
Fig. 5 is a partial perspective view of another storage board of the structure of Fig. 1 in its stored position.
Fig. 6 is a detailed view taken along line 6—6 of Fig. 5 showing one of the posts of the structure of the present invention.

As is shown in Fig. 1, the preferred embodiment of the present invention includes an enclosure box 21 having one side 22 hinged at its bottom by a long hinge 23 to open outwardly and downwardly as shown in Fig. 1 and 4. The box may be provided with feet 24 on its bottom, and it may have a handle 25, of leather or other suitable material, at its top. A locking or clamping device having parts 26, on the door 22, and 27, on the box 21, is of a type which latches the box against inadvertent opening during normal carrying. The narrower side walls are provided with a series of flanges arranged parallel to the top and bottom of the box. These flanges advantageously all extend from the back of the box, but they are terminated before the front of the box. Alternate flanges 29 are somewhat longer than intermediate flanges 30 for reasons which will appear hereafter. The flanges 29 support the bottom of the reel support boards 10, 31, 32, 33, and 34. Each board is supported along its ends by the flanges so that the boards are slidable along flanges 29 toward and away from the open side of the box. Each of the support boards is essentially alike in that each has posts 11 and 12 and each of the boards has similar parts designated herein with similar numerals. Each board in this embodiment of the invention is a tray and each is provided with side walls 36 and back wall 37. Each of the side walls is provided with a hook or stop 38 which preferably extends upwardly into contact with a flange 30 when in the enclosure 21 so that effectively each tray slides between the flanges 29 and 30. Also contributing to the side effect are stud members 39 which as can best be seen in Fig. 3 are arranged to lie in contact with the top edges of the respective walls 36. Each of the trays is also provided with a central tab 41 which may be placed between the thumb and forefinger for withdrawing the tray from the enclosure. The tab 42 of tray 10 differs from the tabs on other trays in that it has an upwardly extending knob 43 which is desirable because it facilitates movement of tray 10.

As will be observed in Fig. 4, when the tray is withdrawn a certain distance, the tops of its stops no longer contact flanges 30. Shortly beyond this point each stop engages a stud 39 and, with the flange 30 no longer interfering, the weight of the tray tends to cause the forward part of the tray to rotate about the ends of flanges 29 which support the back of the tray. In the course of this rotation niches 46 at the base of each stop 38 engage a pair of studs 39, the stop and stud combining to act as a latch to prevent further withdrawal of the tray. Thereafter rotation is stopped by a pair of pivot supports or rollers 47, one at each end of the tray, supported on opposite endwalls of box 21 below and closer to door 22 than the nearest flange 29. Therefore, the tray in the position of the tray 10 in Fig. 4 comes to rest supported on studs 39 and rollers 47 with its front end lower than its back end, in a position which is convenient for positioning or removing the reels relative to the support board.

Each of the other trays or support boards operates in exactly the same manner, and it is possible to remove each of them by raising the front end to a position higher than that indicated in phantom in Fig. 4. As will be observed, a second niche 48 is provided in each of the tray side walls 36 spaced from the niche 46 the distance between the stud 39 and the next roller 47 above the stud on the same wall so that, the tray rotates about studs 39 as an axis. With niches 46 engaging those studs, niches 48 will engage the pair of rollers 47 above the ones on which the tray rests in a position shown in full in Fig. 4. The tray will thereafter rotate around a pivot support provided by the rollers 47 which they contact and stops 38 will be moved downwardly until they are clear of studs 39 and thus unlatched to that the tray can be withdrawn from the enclosure.

The reverse of the removal process is applicable to the reinsertion of the tray. It will be observed that the back side of stop 38 is provided with a rounded surface which has a sort of camming action facilitating insertion of the tray between flanges 29 and 30.

As will be observed each tray may be provided with downwardly projecting bosses 50 for keeping it raised off of a surface on which it is placed so that the tray may be picked up more easily than would be the case were it completely flat. The bosses 50 also serve to hold the stud bottom 17 of post 12 away from the surface on which the tray is placed.

An upwardly projecting ring boss 51 is provided concentric with each of the posts 11 and 12. The ring boss is not a complete circle but is preferably a sufficient portion of a complete circle to give full support to the reel around most of its periphery. The boss serves to hold the reel off of the surface of the tray which may be dusty or otherwise contaminated and also serves to hold the reel above the shoulder 16 so that the boss is preferably as high as the shoulder 16. Several concentric rings similar to ring 50 may be provided around each post.

A preferred version of the present invention has been described and other embodiments of the invention will occur to those skilled in the art. All such embodiments within the scope and spirit of the claims are intended to be within the scope of the present invention.

I claim:

1. A tape reel storage device comprising a box enclosure, supports within the box enclosure and at least one planar support board and a pair of splined posts supported on the board perpendicular to the board and not freely rotatable relative thereto, spaced sufficiently far apart so that the two reels of the particular size intended to be stored will not overlap when supported on the posts, said splines being adapted to cooperate with the reels so that each reel cannot rotate relative to its supporting post.

2. The structure of claim 1 in which the enclosure has a plurality of support boards arranged generally parallel to one another and slidably supported in the box enclosure.

3. The structure of claim 2 in which the support boards are trays having side walls perpendicular to the planar board, said enclosure providing supports for the trays and said walls being provided with latches which tend to prevent the complete withdrawal of a tray from its support.

4. The structure of claim 3 in which a confining tray support is terminated a substantial distance behind the receiving opening and the latch portions on the enclosure are forward of the support but behind a pivot support at the receiving opening for each tray so that the leading edge of a tray as it is withdrawn from the enclosure through the receiving opening will tend to drop lower than the back edge of the tray under the influence of gravity onto said pivot support thereby limiting the amount of said drop.

5. The structure of claim 4 in which each latch consists of an upward extending member generally higher than the tops of the side walls and a stop against which the upper part of the latch abuts so that the individual trays may be withdrawn from the box by tilting upward the leading edge of the tray to rotate it about the pivot support above and pulling it forward when the tray is in the position in which the latch is effective.

References Cited in the file of this patent

UNITED STATES PATENTS

| | | |
|---|---|---|
| 1,696,473 | De Vry | Dec. 25, 1928 |
| 1,974,830 | Moecker | Sept. 25, 1934 |
| 2,088,047 | Begun | July 27, 1937 |
| 2,560,234 | Masterson | July 10, 1951 |
| 2,677,727 | Haynes | May 4, 1954 |
| 2,704,699 | Evans | Mar. 22, 1955 |